(12) United States Patent
Komeyama et al.

(10) Patent No.: US 7,192,356 B2
(45) Date of Patent: Mar. 20, 2007

(54) CROSS SHAFT JOINT

(75) Inventors: Nobuo Komeyama, Nara (JP); Mitsumasa Ozeki, Nara (JP)

(73) Assignees: Koyo Seiko Co., Ltd., Osaka (JP); Koyo Machine Industries Co., Ltd., Yao (JP)

( * ) Notice: Subject to any disclaimer, the term of this patent is extended or adjusted under 35 U.S.C. 154(b) by 78 days.

(21) Appl. No.: 10/801,692

(22) Filed: Mar. 17, 2004

(65) Prior Publication Data

US 2004/0185943 A1  Sep. 23, 2004

(30) Foreign Application Priority Data

Mar. 17, 2003  (JP)  ............ P.2003-071522

(51) Int. Cl.
*F16D 3/40* (2006.01)
(52) U.S. Cl. ..................... 464/127; 464/134
(58) Field of Classification Search .......... 464/127, 464/128, 134, 180, 135
See application file for complete search history.

(56) References Cited

U.S. PATENT DOCUMENTS

| 1,153,789 | A | * | 9/1915 | Hopkins ............ 464/135 X |
| 1,186,325 | A | * | 6/1916 | Metzger |
| 1,497,735 | A | * | 6/1924 | Richardson ............ 464/180 X |
| 3,824,808 | A |   | 7/1974 | Mangiavacchi |
| 4,090,796 | A | * | 5/1978 | Okuda et al. ............ 464/128 X |
| 4,472,158 | A |   | 9/1984 | Joyner |
| 4,522,608 | A |   | 6/1985 | Joyner |
| 4,721,445 | A | * | 1/1988 | Hoffmann ............ 464/180 X |
| 4,893,962 | A | * | 1/1990 | Komeyama |
| 5,205,190 | A | * | 4/1993 | Kohring ............ 464/180 X |

FOREIGN PATENT DOCUMENTS

| EP | 0 074 625 | 3/1983 |
| JP | 63-303227 | 9/1988 |
| JP | 63-303227 | 12/1988 |
| JP | 11-280848 | 10/1999 |

OTHER PUBLICATIONS

European Search Report dated Nov. 25, 2004.

* cited by examiner

*Primary Examiner*—Greg Binda
(74) *Attorney, Agent, or Firm*—McGinn IP Law Group, PLLC

(57) ABSTRACT

A cross shaft joint tiltably coupling two shaft members each other includes: a cross shaft which includes four shaft portions and is arranged between the two shaft members; outer ring cups rotatably provided to the four shaft portions, respectively, the outer ring cups being adapted to be coupled to corresponding shaft members; and an attachment portion to which a balance weight for balancing the outer ring cups can be attached is formed on at least one of the outer ring cups.

20 Claims, 3 Drawing Sheets

CROSS SHAFT JOINT

BACKGROUND OF THE INVENTION

The present invention relates to a cross shaft joint.

In a power transmitting portion of a vehicle, a cross shaft joint is used to tiltably couple two shaft members to each other. The cross shaft joint includes a cross shaft and four rolling bearings provided in four shaft portions of the cross shaft respectively. The rolling bearing is usually a roller bearing and includes a plurality of needle-shaped rollers and an outer ring cup.

In a conventional cross shaft joint, the outer ring cup is directly fixed to the end of a corresponding shaft member without using a yoke (see Patent Document 1). More specifically, two of the four outer ring cups which are opposed to each other by 180 degrees are integrated in a rotating direction through a key and a key groove at the ends of one of the shaft members, and furthermore, are fixed with a bolt. Two other outer ring cups are also fixed to the ends of the other shaft members in the same way.

Patent Document 1

JP-A-63-303227

In the cross shaft joint described in the Patent Document 1, generally, the schematic shape of the outer ring cup is obtained by die forging in order to enhance the strength of the outer ring cup and to simplify a processing process. In the outer ring cup, an outer ring raceway surface in an inner part is finished with high precision by abrasion after the forging. A side surface and an outer surface such as an outer peripheral surface are left as forged surfaces without finishing. For this reason, a difference in a weight is made for each outer ring cup.

On the manufacturer side of the cross shaft joint, conventionally, the cross shaft joint is assembled into the shaft member. The assembled member of the cross shaft joint and the shaft member is applied to a balancing machine to detect a whole balance. According to a result, a balance piece is attached to the shaft member to carry out a balance adjustment and shipping to customers is then performed.

In the case in which only the cross shaft joint is exchanged in the customer such as a user, however, it is necessary to newly detect and adjust a balance for the whole assembled member including the cross shaft joint. However, the customers usually retain no balancing machine. For this reason, the whole balance adjustment cannot be carried out. Therefore, the customers have to send the assembled member having the cross shaft joint exchanged back to the manufacturer side in order to adjust the balance. Consequently, a great deal of time and labor and an excessive cost are required.

SUMMARY OF THE INVENTION

In order to solve the conventional problems, it is an object of the invention to easily adjust a balance.

In order to solve the aforesaid object, the invention is characterized by having the following arrangement.

(1) A cross shaft joint tiltably coupling two shaft members each other, the cross shaft joint comprising:

a cross shaft which includes four shaft portions and is arranged between the two shaft members;

outer ring cups rotatably provided to the four shaft portions, respectively, the outer ring cups being adapted to be coupled to corresponding shaft members; and an attachment portion to which a balance weight for balancing the outer ring cups can be attached is formed on at least one of the outer ring cups.

(2) The cross shaft joint according to (1), wherein the attachment portion includes an attachment hole having a substantially constant inside diameter, into which a bar-shaped balance weight can be inserted.

(3) The cross shaft joint according to (1), wherein a key groove is formed on an end of one of the shaft members, the outer ring cup is provided with a key portion protruded in a radial direction corresponding to the key groove, and a screw hole concaved in a longitudinal direction of the key portion from an inner end of the key portion in the radial direction is formed, the balance weight having bar shape is adapted to be inserted into the screw hole and fixed with a plug screwed into the screw hole.

DETAILED DESCRIPTION OF PREFERRED EMBODIMENTS

Figure 1:
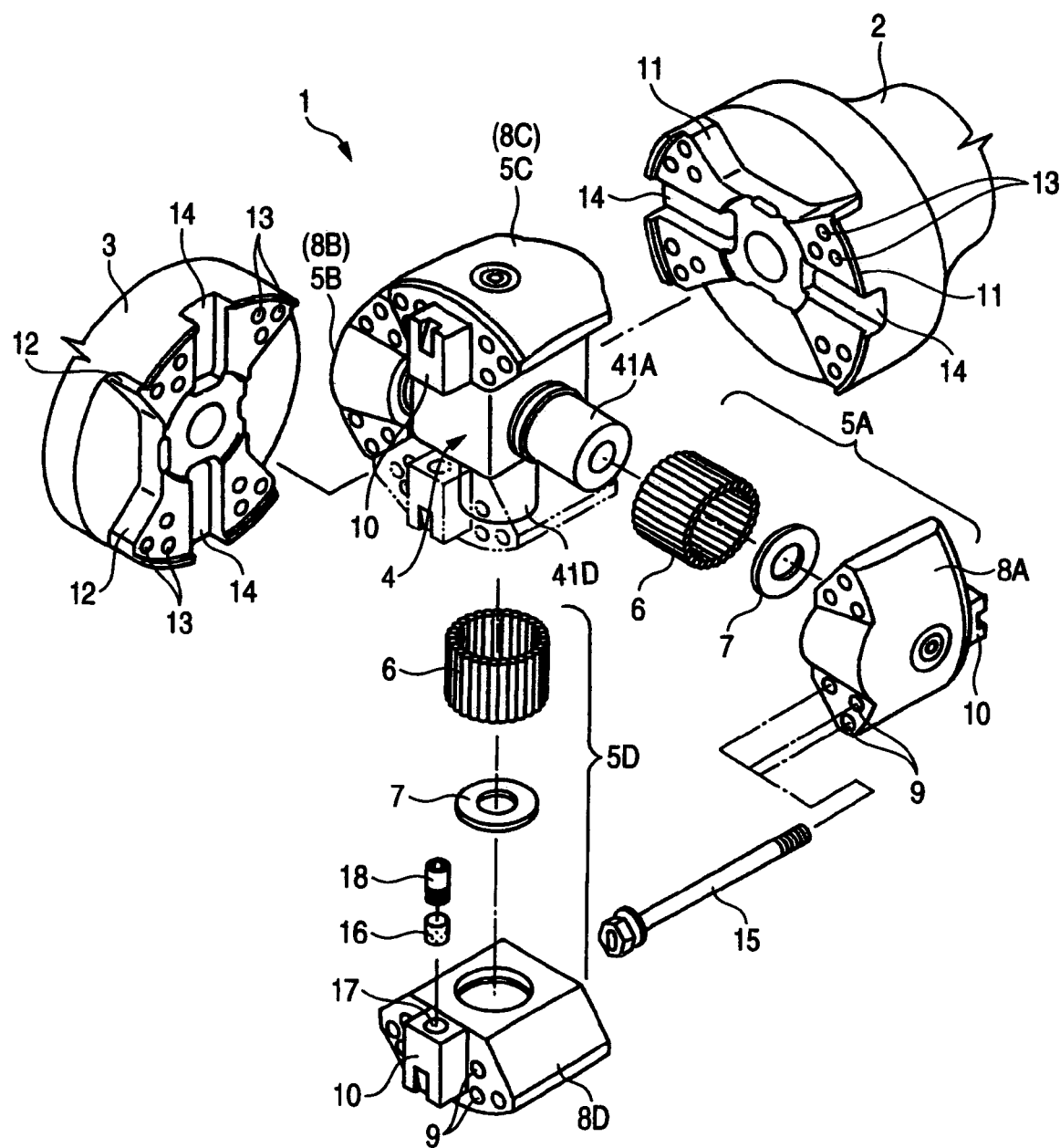
FIG. 1 is a perspective view showing a cross shaft joint according to an embodiment of the invention, a part of which is exploded.
Figure 2:
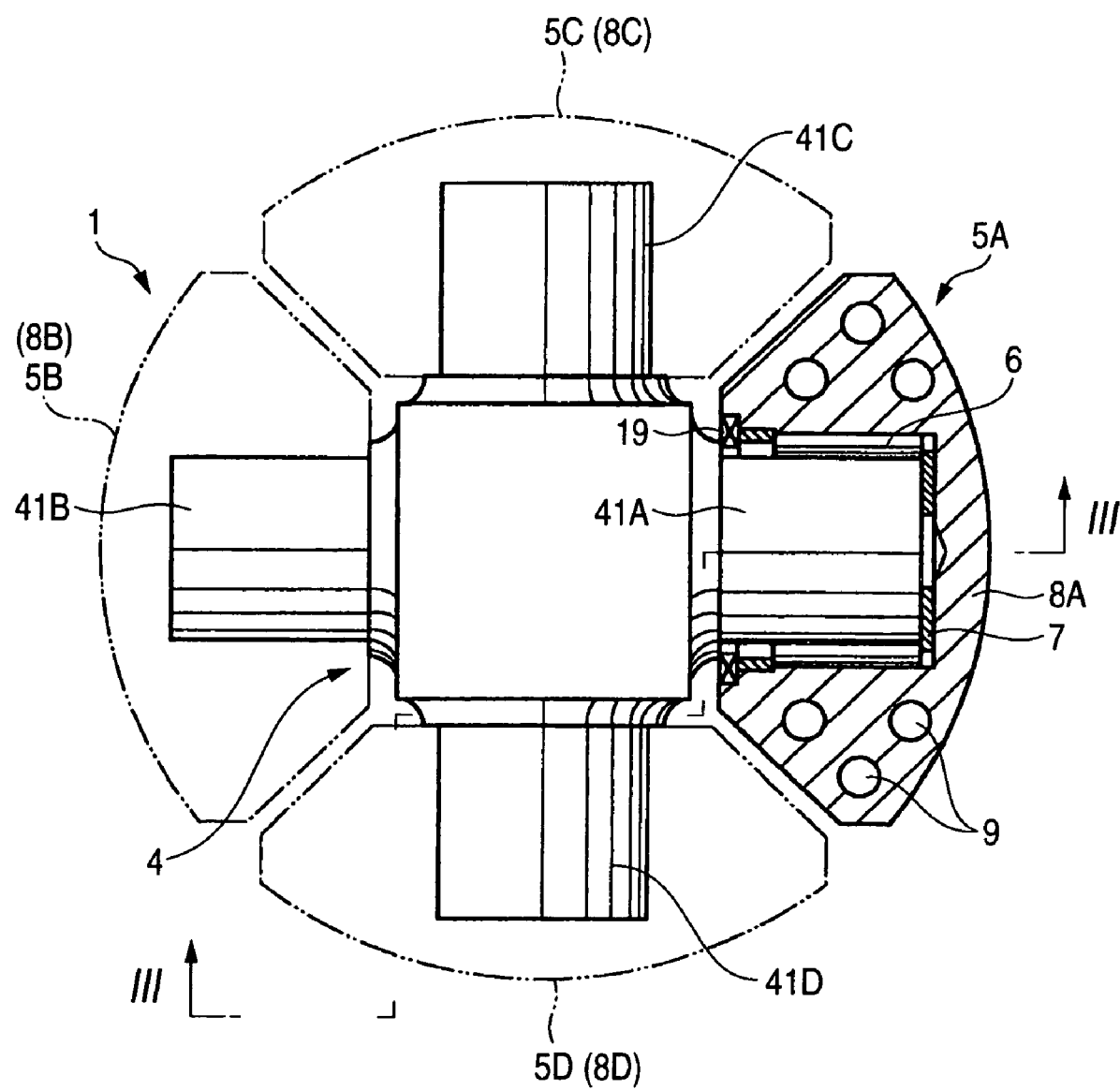
FIG. 2 is a front view showing the cross shaft joint in FIG. 1, illustrating one of outer ring cups in a section and the other outer ring cups in only outer shapes in a chain line.
Figure 3:
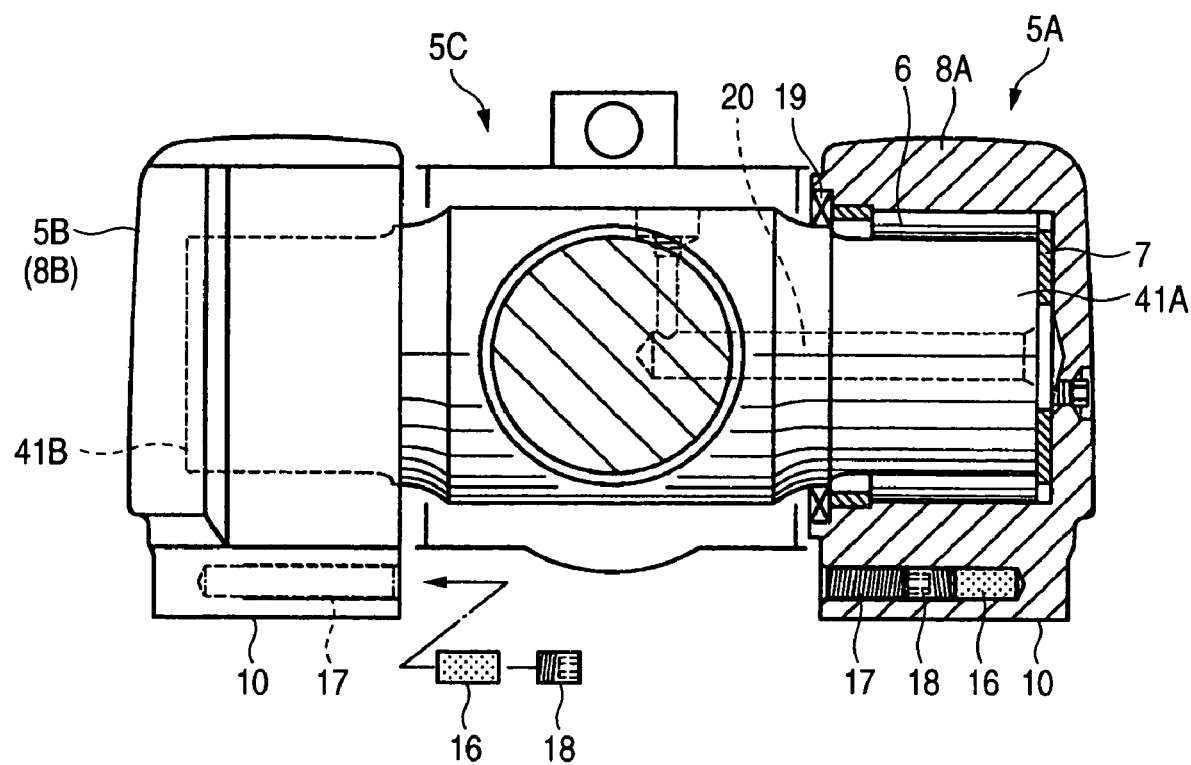
FIG. 3 is a sectional view taken along a line (3)—(3) in FIG. 2.

The invention will be described below in detail with reference to the drawings. FIGS. 1 to 3 show an embodiment of the invention, and FIG. 1 is a perspective view showing a cross shaft joint according to the embodiment, a part of which is exploded. FIG. 2 is a front view showing the cross shaft joint in FIG. 1, illustrating, in a section, one of outer ring cups provided in each shaft portion of a cross shaft and the other outer ring cups in only outer shapes in a chain line. FIG. 3 is a sectional view taken along a line (3)—(3) of FIG. 2.

In these drawings, the reference numeral 1 denotes a whole cross shaft joint, and the reference numerals 2 and 3 denote shaft members coupled tiltably by the cross shaft joint 1. The reference numeral 2 denotes a first shaft member and the reference numeral 3 denotes a second shaft member. The cross shaft joint 1 includes a cross shaft 4, and four roller bearings 5A, 5B, 5C and 5D (which will be generally indicated as 5) provided in four shaft portions 41A, 41B, 41C and 41D (which will be generally indicated as 41) of the cross shaft 4. All of these roller bearings 5 employ the four shaft portions 41 of the cross shaft 4 as inner rings respectively, and include a plurality of needle-shaped rollers 6, a plurality of thrust bushes 7, and outer ring cups 8A, 8B, 8C and 8D (which will be generally indicated as 8). The four roller bearings 5 have identical structures to each other. Referring to the roller bearings 5A and 5D, therefore, internal members are shown in the drawings.

The outer ring cup 8 is a fan-shaped block seen from a front and is formed by die forging. An insertion hole 9 for a bolt is formed on the fan-shaped bulged portion of the outer ring cup 8, and furthermore, a key portion 10 protruded in a radial direction is formed in surface portions opposed to the corresponding shaft members 2 and 3.

On the other hand, the ends of the shaft members 2 and 3 are provided with fan-shaped attachment seats 11 and 12 protruded toward the outer ring cup 8 side corresponding to the outer ring cup 8. The end of the first shaft member 2 is provided with the attachment seats 11 which are opposed to each other by 180 degrees. These two attachment seats 11 and 11 correspond to the two outer ring cups 8A and 8B opposed to each other by 180 degrees. The other attachment seats 12 are provided on the end face of the second shaft member 3 and correspond to two other outer ring cups 8C and 8D.

Each of the attachment seats 11 and 12 is provided with a screw hole 13 in a fan-shaped bulged region thereof, and furthermore, a key groove 14 in a radial direction is formed in a central portion thereof. In a state in which the corresponding outer ring cups 8 are bonded to the attachment seats 11 and 12, the key portion 10 of the outer ring cup 8 is fitted in the key groove 14, and the insertion hole 9 of the outer ring cup 8 corresponds to the screw hole 13. The reference numeral 15 denotes a bolt to be screwed into the screw holes 13 of the attachment seats 11 and 12 of the shaft members 2 and 3 through the insertion holes 9 of the outer ring cups 8. The outer ring cup 8 is fixed to the attachment seats 11 and 12 of the corresponding shaft members 2 and 3 with the bolt 15 so as to be rotated integrally.

Each of the outer ring cups 8 is provided with a balance weight 16 for a balance adjustment with the other outer ring cups 8. More specifically, the outer ring cup 8D is shown in FIG. 1 and the outer ring cups 8A and 8B are shown in FIG. 3 respectively. Thus, a screw hole 17 concaved in the longitudinal direction of the key portion 10 from the inner end of the key portion 10 in a radial direction is formed as the attachment portion for the balance weight 16 in the key portion 10 of each of the outer ring cups 8. Herein, the balance weight 16 is bar-shaped and is inserted in the screw hole 17. An embedded plug 18 is screwed and inserted into the screw hole 17 so that the balance weight 16 is fixed into the screw hole 17. As is clearly illustrated by FIG. 3, the screw hole 17 has a substantially constant inside diameter.

The same screw hole 17 is formed on the key portions 10 of the other outer ring cups 8 which are not shown in FIGS. 1 and 3, and the bar-shaped balance weight 16 is inserted into the screw hole 17 and is fixed with the embedded plug 18. In FIGS. 2 and 3, the reference numeral 19 denotes a seal on the opening side of the roller bearing 5 and the reference numeral 20 denotes an oil feeding path formed in the shaft portion 41 of the cross shaft 4.

In the cross shaft joint 1 having the structure described above, if the outer ring cups 8 are formed by the die forging and outer surfaces are maintained to be forged surfaces which are not subjected to finishing, a difference in a weight is made for each of the outer ring cups 8 and the balance adjustment can be carried out by the balance weight 16.

In order to carry out the balance adjustment by using the balance weight 16, first of all, the weights of two outer ring cups 8 opposed to each other by 180 degrees, for example, the outer ring cups 8A and 8B are measured excluding the balance weight 16 respectively, and furthermore, the weight of the balance weight 16 is regulated based on the result of the measurement. In order to regulate the weight, it is preferable that the balance weight 16 should be cut to have a proper length because it is bar-shaped. The balance weights 16 having the weights regulated are inserted into the screw holes 17 provided on the key portions 10 of the corresponding outer ring cups 8 respectively, and are fixed into the screw holes 17 with the plugs 18. Consequently, the weights of the two outer ring cups 8A and 8B opposed to each other by 180 degrees are equal to each other and a static balance can be taken between the two outer ring cups 8A and 8B. Referring to two other outer ring cups 8C and 8D opposed to each other by 180 degrees, it is preferable that the balance adjustment should be carried out in the same procedure.

As described above, the cross shaft joint 1 having the structure described above can take the static balance by itself. Even if the cross shaft joint 1 is not assembled into the shaft members 2 and 3 to apply the whole assembled member to a balancing machine, accordingly, the balance adjustment can be carried out. The user can exchange and utilize the cross shaft joint without a hindrance.

In addition, since the outer ring cup 8 is a block having a great weight and is provided on each of the shaft ends of the cross shaft 4, a moment of rotations thereof is great. If the static balance is taken for such an outer ring cup 8, it can be supposed that the whole assembled member obtained by assembling the cross shaft joint 1 into the shaft members 2 and 3 is almost balanced. For this reason, it is sufficient that the balance of the whole assembled member obtained by assembling the cross shaft joint 1 into the shaft members 2 and 3 is adjusted finely.

In addition, the screw hole 17 to be the attachment portion for the balance weight 16 can easily be formed and the processing step can be executed without a burden. Since the balance weight 16 is bar-shaped, moreover, it is possible to easily regulate the weight by cutting the balance weight 16 to have a proper length.

In the transmission of a power, furthermore, a centrifugal force acts to press the balance weight 16 into the inner part of the screw hole 17. Consequently, there is no possibility that the balance weight 16 might be jumped out by the centrifugal force. Thus, the balance weight 16 can reliably be held in the screw hole 17.

Moreover, the screw hole 17 to be the attachment portion for the balance weight 16 is provided on the key portion 10 protruded from the body portion of the outer ring cup 8. Therefore, the strength of the outer ring cup 8 can be prevented from being reduced by the screw hole 17.

The attachment portion for the balance weight is not restricted to the screw hole 17 according to the embodiment but may be a square concave portion, and furthermore, the shape of the balance weight may be bar-shaped or plate-shaped. In brief, it is sufficient that the balance weight 16 can be attached to any portion of the outer ring cup 8. For example, the screw hole 17 to be the attachment portion for the balance weight according to the embodiment is not restricted to the above-mentioned shapes but may be formed on the key portion 10 of the outer ring cup 8 so as to be concaved in the longitudinal direction of the key portion 10 from an outer end in a radial direction thereof.

Moreover, it is also possible to form a screw hole which is parallel with the insertion hole 9 for the bolt 15 or a circular hole having no female screw as the attachment portion for the balance weight in the fan-shaped bulged portion of the outer ring cup 8, thereby inserting the bar-shaped balance weight 16 into the same hole. In the case in which the attachment hole for the balance weight is a screw hole, the balance weight may be fixed into the screw hole with a male screw such as a bolt to be screwed into the screw hole or the balance weight itself may be screwed, as a male screw member, into the screw hole. In the case in which the attachment hole is a circular hole having no female screw, the balance weight may be pressed into the hole so as to be fixed into the hole.

As described above, in the case in which the fan-shaped bulged portion of the outer ring cup 8 is utilized for attaching the balance weight, it is desirable that holes such as screw holes should be provided on the respective bulged portions formed on both sides of the key portion 10 to distribute and hold the balance weight 16 into these holes. If the balance weight is provided in a thick portion by utilizing the bulged portion of the outer ring cup 8, the balance weight provided on each of the outer ring cups 8 is almost aligned with a position surrounding the central portion of the cross shaft 4 so that a whole balance can easily be taken.

In addition, the invention is not restricted to the cross shaft joint 1 of such a type as to directly attach the outer ring cup 8 to the shaft members 2 and 3 but can also be executed for a cross shaft joint of such a type as to attach the outer ring cup to the shaft member through a yoke or a yoke-shaped portion formed integrally with the end of the shaft member. Moreover, each shaft portion 41 of the cross shaft 4 may be provided with a rolling bearing other than a roller bearing having a needle-shaped roller.

According to the invention, balance weights having predetermined weights are attached to two outer ring cups opposed to each other by 180 degrees, respectively. Consequently, the weights of the two outer ring cups opposed to each other are caused to be equal so that the static balance of a whole joint can be taken. Accordingly, it is not necessary to assemble a cross shaft joint into a shaft member and to apply the whole assembled member to a balancing machine. Even a user having no balancing machine can easily carry out a balance adjustment.

What is claimed is:

1. A cross shaft joint tiltably coupling two shaft members to each other, the cross shaft joint comprising:
   a cross shaft which includes four shaft portions and is arranged between the two shaft members; and
   outer ring cups rotatably provided to the four shaft portions, respectively, at least one of the outer ring cups comprising a key portion extending in a radial direction corresponding to a key groove in one of the two shaft members and defining an attachment hole extending from an inner end of the key portion in a radial direction.

2. The cross shaft joint according to claim 1, wherein the attachment hole has a substantially constant inside diameter, into which a bar-shaped balance weight can be inserted.

3. The cross shaft joint according to claim 1, wherein
   said key groove is formed on an end of one of the two shaft members, and
   further comprising a balance weight having a bar shape that is adapted to be inserted into the attachment hole and fixed with a plug screwed into the attachment hole.

4. The joint of claim 3, wherein said key groove is formed on an axially-facing end face of said one of the two shaft members and wherein said key groove extends in a radial direction.

5. The cross shaft joint of claim 1, further comprising a balance weight attached to the key portion.

6. The cross shaft joint of claim 5, wherein said balance weight is plate-shaped.

7. The cross shaft joint of claim 5, wherein an outer surface of said balance weight is threaded.

8. The cross shaft joint of claim 1, wherein the attachment hole comprises internal threads.

9. The cross shaft joint of claim 8, wherein the balance weight is positioned inside the attachment hole and the balance weight is fixed by a plug screwed into the internal thread.

10. The cross shaft joint of claim 1, further comprising the balance weight positioned within the attachment hole.

11. The cross shaft joint of claim 1, wherein said attachment hole comprises a square hole.

12. The cross shaft joint of claim 1, wherein the attachment hole is adapted to receive a balance weight pressed into the attachment hole.

13. The cross shaft joint of claim 1, further comprising a balance weight received by the attachment hole of said at least one of the outer ring cups.

14. The cross shaft joint of claim 13, wherein the balance bar comprises a bar shape.

15. The joint of claim 1, wherein said at least one outer ring cup further comprises an axially-extending insertion hole adapted to receive a bolt for attaching said at least one outer ring cup to a screw hole in an end face of one of said two shaft members.

16. The joint of claim 1, wherein a bottom of the attachment hole is narrower than an intermediate portion of the attachment hole.

17. The joint of claim 1, wherein a bottom of the attachment hole is closed.

18. A cross shaft joint comprising:
   a cross shaft including four shafts;
   an outer ring cup rotatable on each of the four shafts, at least one of the outer ring cups comprising a key portion extending in a radial direction and defining a hole extending from an inner end of the key portion in a radial direction; and
   a balance weight received by the hole of said at least one of the outer ring cups.

19. The joint of claim 18, wherein a bottom of the attachment hole is narrower than an intermediate portion of the attachment hole.

20. The joint of claim 18, wherein a bottom of the attachment hole is closed.

* * * * *